United States Patent
Kim et al.

(10) Patent No.: US 8,705,104 B2
(45) Date of Patent: Apr. 22, 2014

(54) IMAGE FORMING APPARATUS AND METHOD OF CONTROLLING THE SAME

(75) Inventors: Jong Ha Kim, Yongin-si (KR); Ki Young Lee, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 195 days.

(21) Appl. No.: 13/361,199

(22) Filed: Jan. 30, 2012

(65) Prior Publication Data

US 2012/0194865 A1 Aug. 2, 2012

(30) Foreign Application Priority Data

Feb. 1, 2011 (KR) .................. 10-2011-0010356

(51) Int. Cl.
*G06F 3/12* (2006.01)
*H04N 1/04* (2006.01)

(52) U.S. Cl.
USPC .............. 358/1.15; 358/474; 345/87; 345/98; 345/99; 399/81

(58) Field of Classification Search
USPC ........ 358/434, 435, 436, 438, 305, 474, 1.15; 715/255; 345/87, 98, 99; 348/222.1; 399/81

See application file for complete search history.

(56) References Cited

U.S. PATENT DOCUMENTS

| | | | |
|---|---|---|---|
| 5,602,625 A * | 2/1997 | Okamoto et al. | 399/21 |
| 5,659,469 A * | 8/1997 | Deaton et al. | 705/14.25 |
| 7,684,092 B2 * | 3/2010 | Ishii | 358/474 |
| 2004/0012551 A1 * | 1/2004 | Ishii | 345/87 |
| 2007/0081185 A1 * | 4/2007 | Nagatani et al. | 358/1.15 |

* cited by examiner

*Primary Examiner* — Dennis Dicker
(74) *Attorney, Agent, or Firm* — Staas & Halsey LLP

(57) ABSTRACT

An image forming apparatus and a method of controlling the same which may prevent brokenness of data displayed on a display are provided. The image forming apparatus performs a read operation on data previously stored at a specific address of a storage unit of an LCD module or on data stored through a write operation. The image forming apparatus compares data acquired through the read operation and known data. If the data acquired through the read operation and the known data are different, the image forming apparatus adjusts a setup time of an enable signal to prevent brokenness of data due to incorrect timing of the enable signal.

26 Claims, 13 Drawing Sheets

IMAGE FORMING APPARATUS AND METHOD OF CONTROLLING THE SAME

CROSS-REFERENCE TO RELATED APPLICATIONS

This application claims the benefit of Korean Patent Application No. 2011-0010356, filed on Feb. 1, 2011 in the Korean Intellectual Property Office, the disclosure of which is incorporated herein by reference.

BACKGROUND

1. Field

Embodiments of the present invention relate to an image forming apparatus and a method of controlling the same which may prevent brokenness of data displayed on a display.

2. Description of the Related Art

The image forming apparatus is a device to form an image on a recording medium. Examples of the image forming apparatus include a printer, a copier, a facsimile machine, and a multifunction device that has been implemented by combining functions of these devices.

The multifunction device has been designed as a single device to perform various functions, for example, printing, copying, and facsimile functions. The multifunction device includes an image reader to read an image recorded on an original medium through an image sensor and a print device to print an image on a print medium. The multifunction device may further include an LCD module to display a print state, an operating state, and the like and a microcomputer to transmit a control signal to the LCD module.

Since a small image forming apparatus such as the multifunction device is installed near to a heat source such as a fusing device or an LCD module, data displayed on a display of the image forming apparatus may be broken due to overheating. In addition, since the LCD module is located above a paper discharge portion where printed paper is discharged, data displayed on the display of the image forming apparatus may be broken due to latent heat of the printed paper.

Further, in the case where the LCD module is replaced, broken data may be displayed on the display due to incorrect timing of a control signal transmitted to the LCD module.

SUMMARY

Therefore, it is an aspect of the present disclosure to provide an image forming apparatus and a method of controlling the same which may prevent brokenness of data displayed on a display.

Additional embodiments will be set forth in part in the description which follows and, in part, will be obvious from the description, or may be learned by practice of the invention.

In accordance with one embodiment, an image forming apparatus includes a microcomputer including a data transceiver to transmit a write signal and data to a liquid Crystal Display (LCD) module to perform a write operation on a storage unit of the LCD module, to transmit a read signal to the LCD module to perform a read operation on the written data, and to receive data acquired through the read operation, a data comparator to compare the data transmitted for the write operation and the data acquired through the read operation, an enable signal adjuster to adjust a setup time of an enable signal when the data transmitted for the write operation and the data acquired through the read operation are different, and an enable signal transmitter to transmit an enable signal according to the setup time.

The microcomputer further may include a memory to store a basic setup time of the enable signal.

Adjusting the setup time may include extending the basic setup time of the enable signal by a predetermined interval.

Adjusting the setup time by extending the basic setup time of the enable signal by a predetermined interval may include adjusting the setup time by comparing data transmitted for the write operation and data acquired through the read operation at least once and repeatedly increasing the basic setup time until the data transmitted for the write operation and the data acquired through the read operation are identical.

Adjusting the setup time may include adjusting the setup time when the image forming apparatus is initially powered on or adjusting the setup time when a predetermined time has elapsed during consecutive printing or when a predetermined number of pages have been printed.

The microcomputer may further include a power source to provide power to the LCD module and a scaler to convert various input signals input to the LCD module into digital signals and to scale the digital signals.

In accordance with another embodiment, an image forming apparatus includes a microcomputer including a data transceiver to transmit a read signal to perform a read operation on data stored at a specific address of a storage unit of an LCD module and to receive data acquired through the read operation, a memory to store data identical to the data stored at the specific address of the storage unit, a data comparator to compare the data acquired through the read operation and data previously stored in the memory, an enable signal adjuster to adjust a setup time of an enable signal when the data acquired through the read operation and the data previously stored in the memory are different, and an enable signal transmitter to transmit an enable signal according to the setup time.

The microcomputer may further include a memory to store a basic setup time of the enable signal.

Adjusting the setup time may include extending the basic setup time of the enable signal by a predetermined interval.

Adjusting the setup time by extending the basic setup time of the enable signal by a predetermined interval may include adjusting the setup time by comparing the data acquired through the read operation and the data previously stored in the memory at least once and repeatedly increasing the basic setup time until the data acquired through the read operation and the data previously stored in the memory are identical.

Adjusting the setup time may include adjusting the setup time when the image forming apparatus is initially powered on or adjusting the setup time when a predetermined time has elapsed during consecutive printing or when a predetermined number of pages have been printed.

The microcomputer may further include a power source to provide power to the LCD module and a scaler to convert various input signals input to the LCD module into digital signals and to scale the digital signals.

In accordance with another embodiment, a method of controlling an image forming apparatus includes transmitting a write signal and data to a liquid Crystal Display (LCD) module to perform a write operation on a storage unit of the LCD module, transmitting a read signal to perform a read operation on the written data and receiving data acquired through the read operation, and comparing the data transmitted for the write operation and the data acquired through the read operation, adjusting a setup time of an enable signal when the data transmitted for the write operation and the data acquired through the read operation are different, and transmitting an enable signal according to the setup time.

Adjusting the setup time may include adjusting the setup time when the image forming apparatus is initially powered on or adjusting the setup time when a predetermined time has elapsed during consecutive printing or when a predetermined number of pages have been printed.

When the image forming apparatus is initially powered on, a write operation and a read operation may be performed to write and read the data to and from the storage unit according to a basic setup time and data transmitted for the write operation and data acquired through the read operation may be compared to adjust the setup time.

When the predetermined time has elapsed during the consecutive printing or when the predetermined number of pages have been printed, a write operation and a read operation may be performed to write and read the data to and from the storage unit according to a basic setup time and data transmitted for the write operation and data acquired through the read operation may be compared to adjust the setup time.

When the image forming apparatus is initially powered on or when the predetermined time has elapsed during the consecutive printing or when the predetermined number of pages have been printed, a write operation and a read operation may be performed to write and read the data to and from the storage unit according to a basic setup time, and data transmitted for the write operation and data acquired through the read operation may be compared, and then the setup time may be adjusted by increasing the basic setup time when the data transmitted for the write operation and the data acquired through the read operation are different.

In accordance with another embodiment, a method of controlling an image forming apparatus includes transmitting a read signal to perform a read operation on data stored at a specific address of an LCD module and receiving data acquired through the read operation, comparing the data acquired through the read operation and data previously stored in a memory, and adjusting a setup time of an enable signal when the data acquired through the read operation and the data previously stored in the memory are different.

Adjusting the setup time may include adjusting the setup time when the image forming apparatus is initially powered on or adjusting the setup time when a predetermined time has elapsed during consecutive printing or when a predetermined number of pages have been printed.

When the image forming apparatus is initially powered on, a read operation may be performed on data at the specific address of the storage according to a basic setup time and the data acquired through the read operation and the data previously stored in the memory may be compared to adjust the setup time.

When the predetermined time has elapsed during the consecutive printing or when the predetermined number of pages have been printed, a read operation may be performed on data at the specific address of the storage according to a basic setup time and the data acquired through the read operation and the data previously stored in the memory may be compared to adjust the setup time.

When the image forming apparatus is initially powered on or when the predetermined time has elapsed during the consecutive printing or when the predetermined number of pages have been printed, a read operation may be performed on data at the specific address of the storage according to a basic setup time, and the data acquired through the read operation and the data previously stored in the memory may be compared, and then the setup time may be adjusted by increasing the basic setup time when the data acquired through the read operation and the data previously stored in the memory are different.

In accordance with another embodiment, an image forming apparatus includes an LCD module, wherein the LCD module receives data and a write signal from a microcomputer and writes the data to a storage unit at a specific address, and the LCD module performs a read operation on data written to the specific address upon receiving a read signal from the microcomputer and transmits the read data to the microcomputer.

In accordance with another aspect of the present invention, an image forming apparatus includes an LCD module, wherein the LCD module performs a read operation on data previously stored in a storage unit at a specific address upon receiving a read signal from a microcomputer and then transmits data acquired through the read operation to the microcomputer.

The LCD module may include a liquid crystal panel and the liquid crystal panel is provided above a paper discharge portion.

According to the aspects of the present invention, it may be possible to prevent brokenness of data displayed on the display since the setup time is adjusted when the image forming apparatus is initially powered on or when a predetermined time has elapsed during consecutive printing or when a predetermined number of pages have been printed.

BRIEF DESCRIPTION OF THE DRAWINGS

These and/or other aspects of the invention will become apparent and more readily appreciated from the following description of the embodiments, taken in conjunction with the accompanying drawings of which:

FIG. 4B illustrates that the data signal has been changed as electric characteristics have changed due to external temperature change or the like;

DETAILED DESCRIPTION

Figure 1:
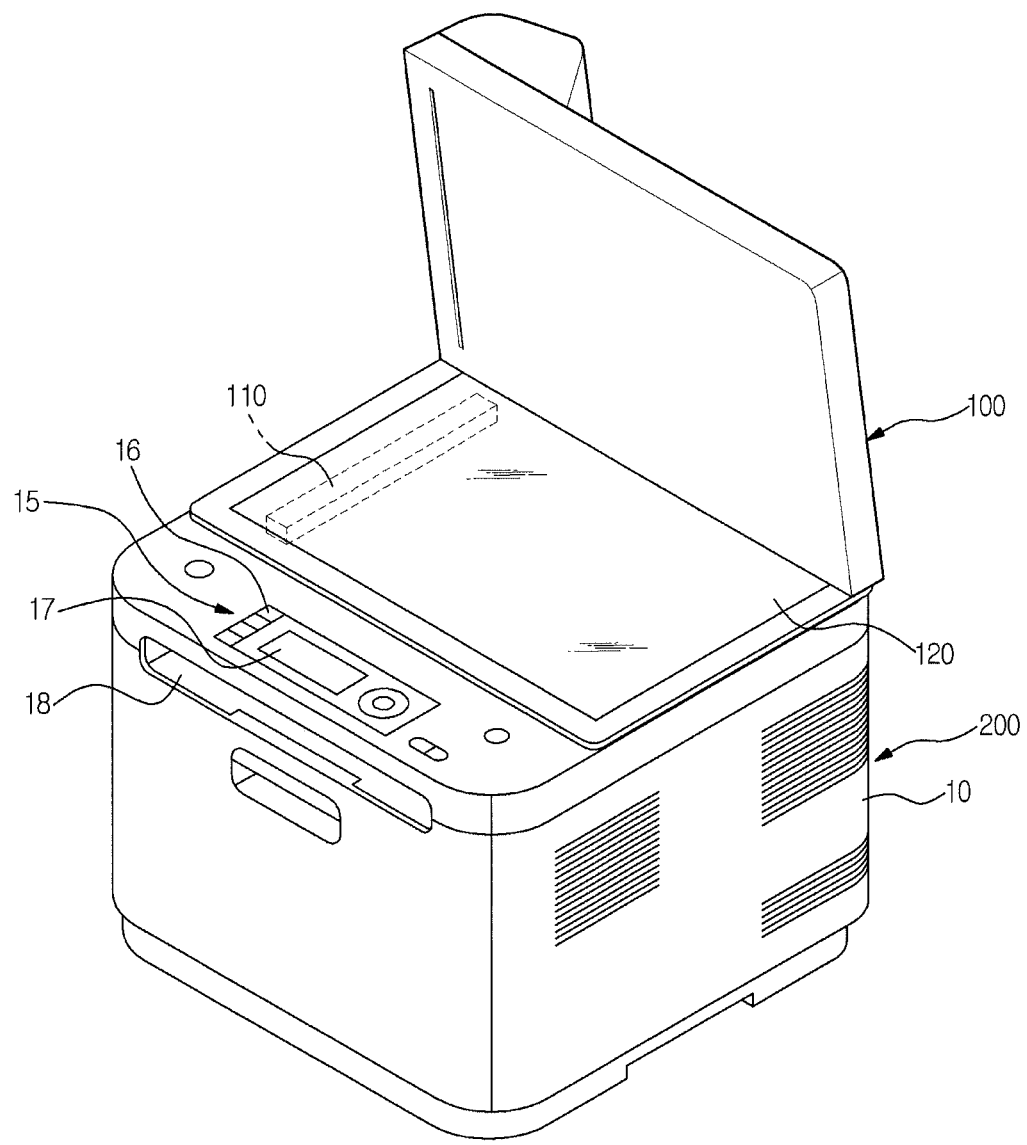
FIG. 1 is a perspective view of a multifunction device which is an example of an image forming apparatus according to an embodiment of the present invention

Reference will now be made in detail to the embodiments of the present invention, examples of which are illustrated in the accompanying drawings, wherein like reference numerals refer to like elements throughout.

Figure 2:
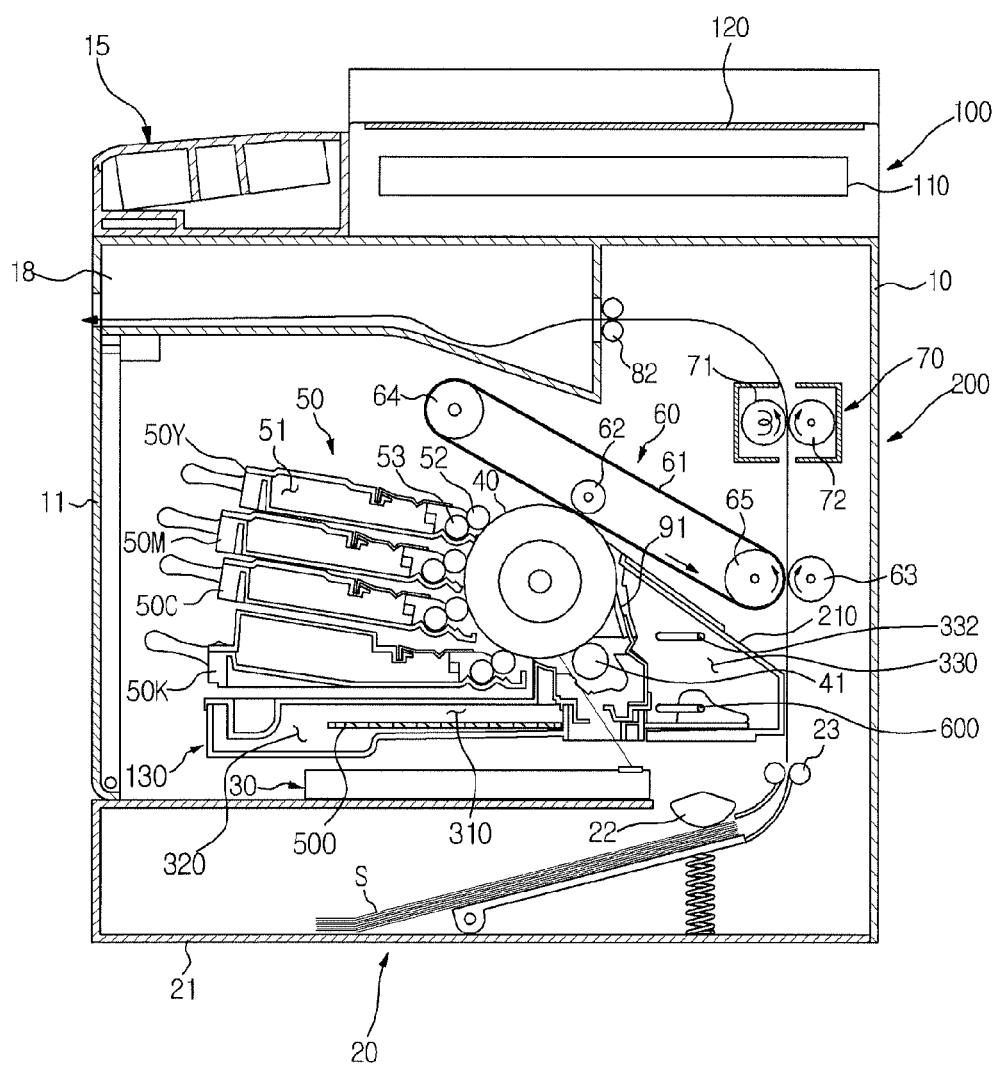
FIG. 2 is a sectional view of the multifunction device of FIG. 1.

FIG. 1 is a perspective view of a multifunction device which is an example of an image forming apparatus according to an embodiment of the present invention and FIG. 2 is a sectional view of the multifunction device of FIG. 1.

As shown in FIGS. 1 and 2, the image forming apparatus 1 may include an image read device 100 and a print device 200 which prints an image on a sheet of paper.

The image read device 100 may include a scan unit 110 and a flat glass 120. The scan unit 110 is located below the flat glass 120 and reads image information recorded on an original medium placed on the flat glass 120. The scan unit 110 emits light to the original medium and detects light reflected from the original medium. The scan unit 110 converts the detected intensity of light into an electrical signal to read information from the original medium. A Contact Image Sensor (CIS) or a Charge Coupled Device (CCD) may be used as the image read device 100.

The print device 200 prints an image according to a signal input from the image read device 100 or a signal input from an external device such as a PC. The print device 200 includes a body 10, a print medium supply device 20, a light scan device 30, a photosensitive body 40, a development device 50, a transfer device 60, a fusing device 70, and a print medium discharge device 80.

The body 10 defines the external appearance of the image forming apparatus 1 and supports various components provided in the image forming apparatus 1. A display panel 15 is provided at one side of the body 10. The display panel 15 includes an operating unit 16 and a liquid crystal panel 17. The display panel 15 is located above a paper discharge unit 18 which discharges sheets of print media. When a number of sheets of print media are printed consecutively, data displayed on the liquid crystal panel 17 may be broken due to the influence of latent heat of sheets of print media stored in the paper discharge unit 18.

The body cover 11 is rotatably mounted at one side of the body 10.

The print medium supply device 20 supplies sheets of print media toward the transfer device 60. The print medium supply device 20 includes a cassette 21 in which sheets of print media S are stored, a pickup roller 22 that picks up the print media S stored in the cassette 21 sheet by sheet, and a conveyance roller 23 that conveys the picked-up print media toward the transfer device 60.

The light scan device 30 is provided below the developer storage device 130 and scans light corresponding to image information onto the photosensitive body 40 to form an electrostatic latent image on the surface of the photosensitive body 40.

The photosensitive body 40 is an image carrier that holds an electrostatic latent image formed by the light scan device 30 and a developing image formed by the development device 50.

The photosensitive body 40 is rotatably mounted in a housing 210 that is detachably mounted to the body 10. A charging roller 41 is mounted in the housing 210. The charging roller 41 charges the photosensitive body 40 to a predetermined level of voltage before the light scan device 30 scans light to the photosensitive body 40.

After one cycle of developing and transfer processes is completed, the developer storage device 130 collects and stores developer left on the surface of the photosensitive body 40. The developer storage device 130 is integrated with the housing 210 in which the photosensitive body 40 is mounted. A detailed configuration of the developer storage device 130 will be described later.

The development device 50 supplies developer to the photosensitive body 40, on which an electrostatic latent image has been formed, to form a visible image. The development device 50 may include developing units that contain different colors of developers, for example, 4 developing units 50Y, 50M, 500, and 50K that contain developers of yellow (Y), magenta (M), cyan (C), and black (K).

Each of the developing units 50Y, 50M, 50C, and 50K includes a developer container 51, a supply roller 52, and a development roller 53. The developer container 51 stores a developer to be supplied to the photosensitive body 40 and the supply roller 52 supplies the stored developer to the development roller 53. The development roller 53 attaches a developer to the surface of the photosensitive body 40, on which an electrostatic latent image has been formed, to form a visible image.

The transfer device 60 includes an intermediate transfer belt 61, a first transfer roller 62, and a second transfer roller 63.

The intermediate transfer belt 61 is an image carrier that holds a visual image formed by the development device 50.

The intermediate transfer belt 61 is supported by support rollers 64 and 65 and runs at the same speed as the linear speed of the photosensitive body 40. The first transfer roller 62 opposes the photosensitive body 40 with the intermediate transfer belt 61 interposed therebetween and allows the visual image formed on the photosensitive body 40 to be transferred to the intermediate transfer belt 61.

The second transfer roller 63 opposes the support roller 65 with the intermediate transfer belt 61 interposed therebetween. The second transfer roller 63 is separated from the intermediate transfer belt 61 while an image is being transferred from the photosensitive body 40 to the intermediate transfer belt 61 and is brought into contact with the intermediate transfer belt 61 at a predetermined level of pressure when the image has been completely transferred from the photosensitive body 40 to the intermediate transfer belt 61. When the second transfer roller 63 has been brought into contact with the intermediate transfer belt 61, the image on the intermediate transfer belt 61 is transferred to the print medium.

The fusing device 70 includes a heating roller 71 including a heat source and a pressure roller 72 that is mounted opposite the heating roller 71. When the print medium is passing between the heating roller 71 and the pressure roller 72, the image is fixed to the print medium by both heat transferred from the heating roller 71 and pressure applied between the heating roller 71 and the pressure roller 72.

The print medium discharge device 80 includes a paper discharge roller 81 and a page discharge backup roller 82 and discharges the print medium that has passed through the fusing device 70.

The following is a brief description of the operation of the image forming apparatus configured as described above. When a print operation is initiated, the surface of the photosensitive body 40 is uniformly charged by the charging roller 41. The light scan device 30 scans light corresponding to image information of a color, for example, yellow, to the surface of the photosensitive body 40 to form an electrostatic latent image corresponding to the image information of yellow on the photosensitive body 40.

Then, a development bias is applied to the development roller 53 of the yellow developing unit 50Y. This allows a developer of yellow to be attached to the electrostatic latent image to form a visible image of yellow on the photosensitive body 40. This visible image is transferred to the intermediate transfer belt 61 by the first transfer roller 62.

When transfer of yellow corresponding to one page is completed, the light scan device 30 scans light corresponding to image information of another color, for example, magenta, to the photosensitive body 40 to form an electrostatic latent image corresponding to the image information of magenta on the photosensitive body 40. The magenta developing unit 50M supplies a magenta developer to the electrostatic latent image to form a visual image. The visual image of magenta formed on the photosensitive body 40 is transferred to the intermediate transfer belt 61 by the first transfer roller 62 such that the visual image of magenta overlaps the visual image of yellow that has been previously transferred to the photosensitive body 40.

When the same procedure has been performed on cyan and black, a complete color image, which is an overlapping image of the yellow, magenta, cyan, and black images, is formed on the intermediate transfer belt 61. The complete color image is transferred to the print medium that is passing between the intermediate transfer belt 61 and the second transfer roller 63 and the print medium is discharged from the body 10 via the fusing device 70 and the print medium discharge device 80.

Figure 3:
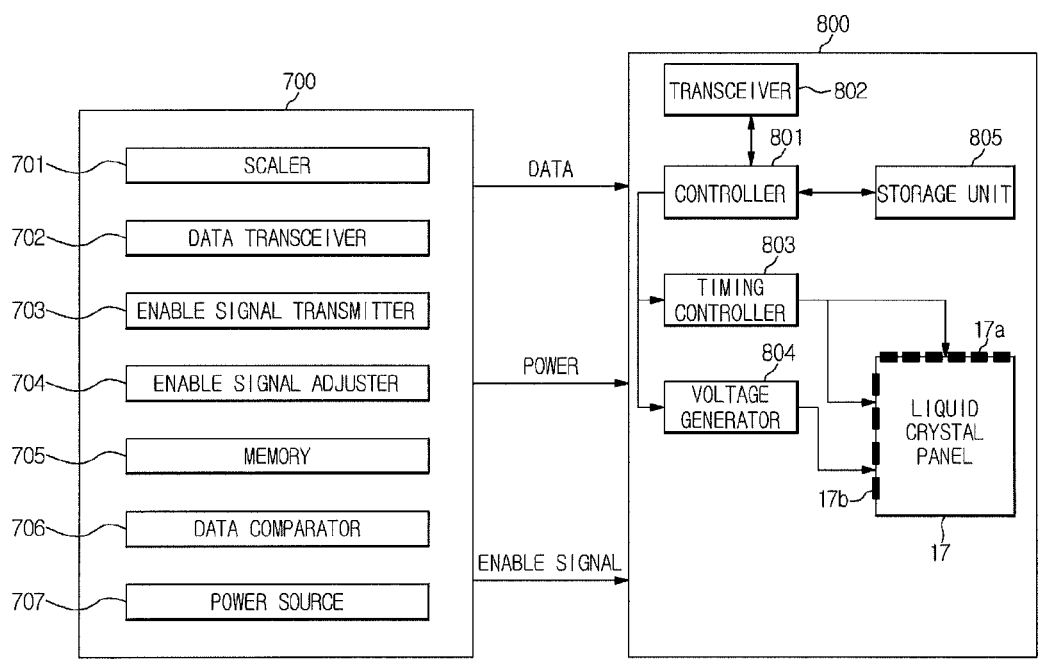
FIG. 3 is a control block diagram of a display provided on the multifunction device of FIG. 1.

FIG. 3 is a control block diagram of the display panel provided on the multifunction device of FIG. 1.

The control block of the display panel 15 may include a microcomputer 700 and an LCD module 800.

The microcomputer 700 may include a scaler 701, a data transceiver 702, an enable signal transmitter 703, an enable signal adjuster 704, a memory 705, a data comparator 706, and a power source 707 and the LCD module 800 may include a controller 801, a transceiver 802, a timing controller 803, a voltage generator 804, a storage unit 805, and the liquid crystal panel 17.

The scaler 701 of the microcomputer 700 may convert various signals input to the LCD module 800 into digital signals and may scale the digital signals to suit the LCD module 800.

The data transceiver 702 of the microcomputer 700 may transmit data scaled by the scaler 701 to the LCD module 800 or may receive data from the LCD module 800. The data transceiver 702 may transmit a write signal to the LCD module 800. When the data transceiver 702 transmits the write signal, the data transceiver 702 may transmit specific data to be written, together with the write signal, to the LCD module 800. Here, the data transceiver 702 may transmit the specific data and the write signal at different times. The data transceiver 702 may transmit a read signal to the LCD module 800. The data transceiver 702 may receive data read by the storage unit 805 of the LCD module 800 according to the read signal.

The enable signal transmitter 703 of the microcomputer 700 may transmit an enable signal to the LCD module 800. When the data transceiver 702 transmits data, the enable signal transmitter 703 transmits an enable signal according to a setup time stored in the memory 705.

The memory 705 of the microcomputer 700 may store a setup time or a hold time of the enable signal that has been basically set. The memory 705 may store the same data as data that has been previously stored in the storage unit 805 of the LCD module 800 at a specific address.

The data comparator 706 of the microcomputer 700 may compare specific data that has been previously stored in the memory 705 with data that has been written/read to/from the storage unit 805 of the LCD module 800 at a specific address. Here, the data that has been written/read indicates data that has been read from the storage unit 805 of the LCD module 800 at a specific address of the storage unit 805 after being written to the storage unit 805 at the specific address under control of the microcomputer 700. The data comparator 706 may compare specific data that has been previously stored in the memory 705 with data that has been stored/read to/from the storage unit 805 of the LCD module 800 at a specific address. Here, the data that has been stored/read indicates data that has been read from the storage unit 805 of the LCD module 800 at a specific address of the storage unit 805 after being stored in the storage unit 805 at the specific address during a design procedure.

The enable signal adjuster 704 of the microcomputer 700 may adjust the setup time of the enable signal according to the result of comparison by the data comparator 706. The enable signal adjuster 704 may extend the setup time if the specific data that has been previously stored in the memory 705 is different from data that has been written/read at the specific address of the storage unit 805 of the LCD module 800. The enable signal adjuster 704 may extend the setup time if the specific data that has been previously stored in the memory 705 is different from data that has been stored/read at the specific address of the storage unit 805 of the LCD module 800.

The power source 707 of the microcomputer 700 may supply power that may be required to drive the LCD module 800.

Upon receiving a write/read signal from the microcomputer 700, the controller 801 of the LCD module 800 may write or read the specific data in the storage unit 805 at the specific address.

The transceiver 802 of the LCD module 800 may receive a data signal, a read/write signal, power, a drive voltage, a common voltage, and a control signal (including an enable signal) from the microcomputer 700. When data that has been written or stored in the storage unit 805 at a specific address is read from the storage unit 805, the transceiver 802 may transmit the read signal to the microcomputer 700.

The timing controller 803 of the LCD module 800 separates the control signal and drive voltage received through the transceiver 802 into signals that may be required for the driver units of the liquid crystal panel 17 and distributes data signals to the source driver 17b and controls the gate driver 25.

The voltage generator 804 of the LCD module 800 converts the common voltage and power received through the transceiver 802 into a reference voltage and a drive voltage to be input to each driver IC and delivers the reference voltage and drive voltage to the driver IC.

The storage unit 805 of the LCD module 800 is a memory that may store data. The storage unit 805 has a plurality of addresses at which data may be stored and may allow specific data to be stored at a specific address.

The liquid crystal panel 17 of the LCD module 800 includes the gate driver 17a and the source driver 17b and displays information.

Figure 4A:
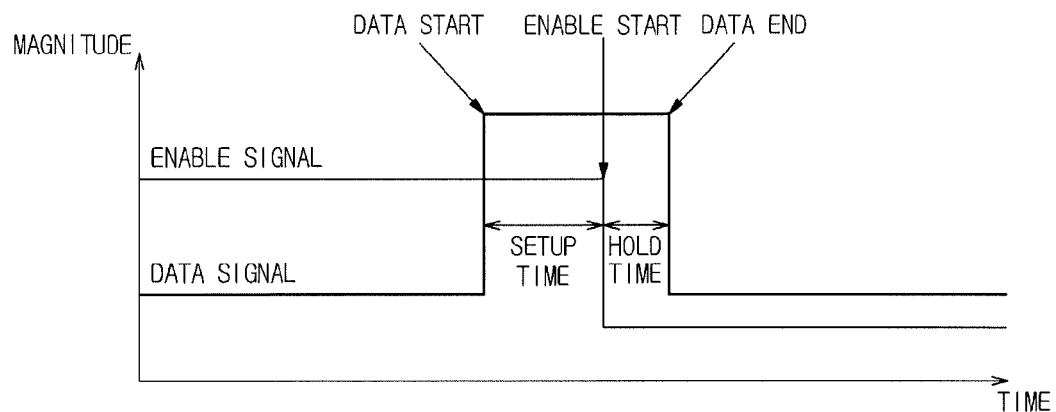
FIG. 4A illustrates a data signal and an enable signal transmitted from a microcomputer to an LCD module.
Figure 4B:
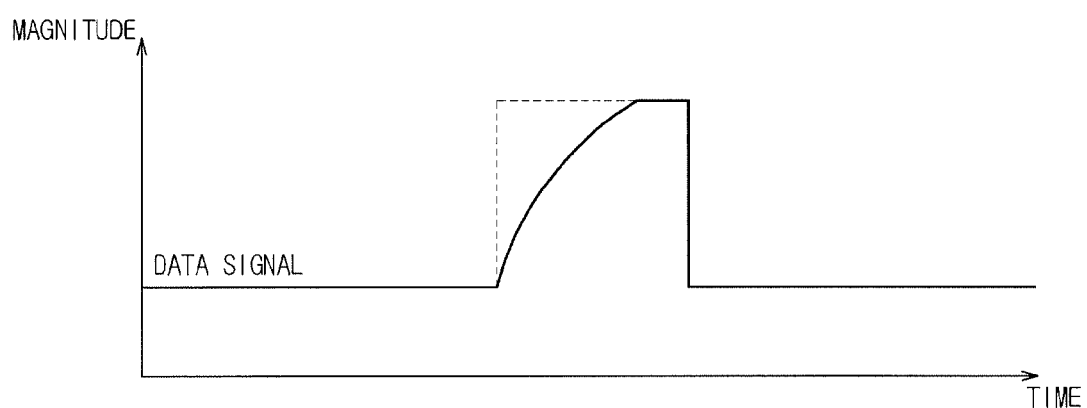
Figure 4C:
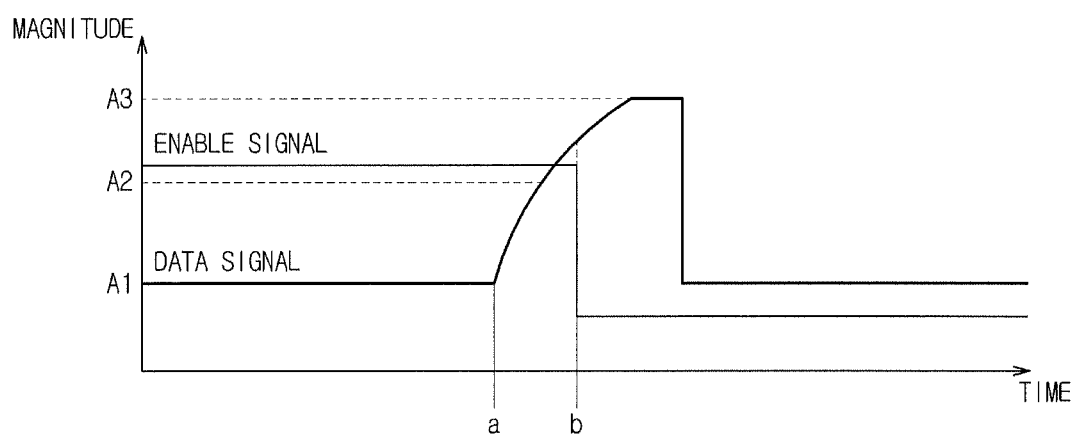
FIG. 4C illustrates the data signal of FIG. 4B and the set enable signal.
Figure 4D:
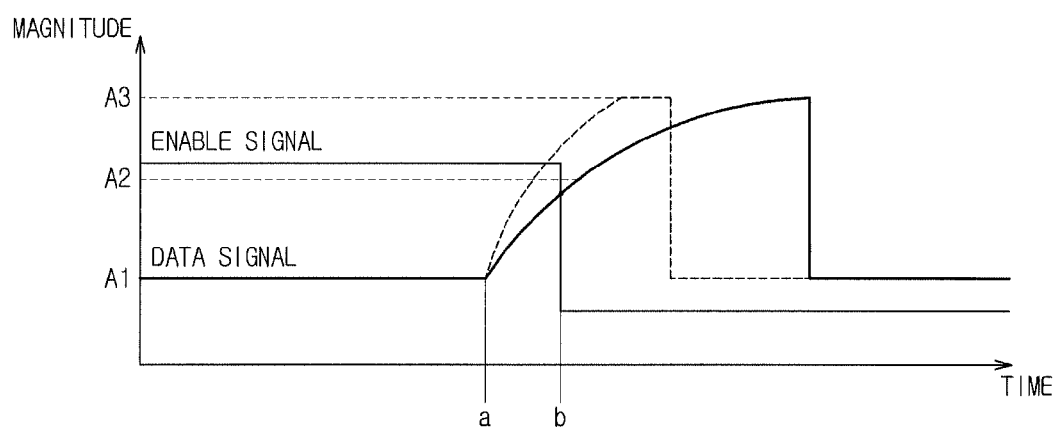
FIG. 4D illustrates that the data signal of FIG. 4C has been altered due to brokenness or the like such that the timing of the data signal does not match the timing of the enable signal.

FIG. 4A illustrates a data signal and an enable signal transmitted from the microcomputer 700 to the LCD module 800, FIG. 4B illustrates that the data signal has been changed as electric characteristics have changed due to external temperature change or the like, FIG. 4C illustrates the data signal of FIG. 4B and the set enable signal, and FIG. 4D illustrates that the data signal of FIG. 4C has been altered due to brokenness or the like such that the timing of the data signal does not match the timing of the enable signal.

Figure 5:
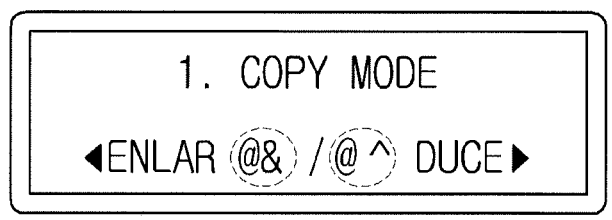
FIG. 5 illustrates that information displayed on a display provided on an image forming apparatus according to an embodiment of the present invention has been broken.

FIG. 5 illustrates that information displayed on a display provided on an image forming apparatus according to an embodiment of the present invention has been broken.

Referring to FIG. 4B, when the data transceiver 702 transmits a data signal to drive the LCD module 800, the enable signal transmitter 703 transmits an enable signal at a specific time according to the setup time.

The LCD module 800 starts reading and processing the data signal when the enable signal is transmitted. Here, a read start signal such as the enable signal may be necessary because the data signal is not transmitted in an ideal signal form shown in FIG. 4A.

Referring to FIG. 4B, a data signal is actually transmitted in the form of gradually increasing (or decreasing) magnitude. The LCD module 800 identifies the data value as "0" when the magnitude of the data signal is such that A1≤magnitude≤A2 and "1" when A2<magnitude≤A3. Thus, an enable signal used to initiate reading after a predetermined setup time (b-a) has elapsed may be needed since the LCD module 800 identifies the data value as "0" during the interval from time "a" to time "b" in which the data signal changes even though the LCD module 800 has read the data.

Referring to FIG. 4C, the enable signal transmitter 703 is designed to output an enable signal after the time (b-a) has elapsed after the data signal starts to be transmitted since information of the data signal may be identified (as "1" in FIG. 4C) after the time (b-a) has elapsed. The designer may measure setup/hold times of data and enable signals during design and may set the setup/hold time stored in the memory 705 based on data sheets of the microcomputer 700 and the LCD module 800.

However, if an electrical characteristic change has occurred due to external noise or temperature change during communication between the microcomputer 700 and the LCD module 800 or when the LCD module 800 connected to the microcomputer 700 has been altered, information of the transmitted data signal may be differently identified due to change of the transmitted data signal even when an enable signal is generated at a stored setup time as shown in FIG. 4D. If the LCD module 800 differently identifies the information of the transmitted data signal, a letter, a symbol, or the like displayed on the liquid crystal panel 17 may be broken as shown in FIG. 5.

Accordingly, in accordance with one embodiment, the microcomputer 700 may store a minimum setup time, which has been calculated through experimentation, by default and transmit specific data to the LCD module 800 to write the data at a specific address of the memory 705 and then to again read the written data to check whether or not the data has been correctly written/read and then adjust the setup time of the enable signal according to the checked result to prevent brokenness of a letter, a symbol, or the like displayed on the liquid crystal panel 17.

In accordance with one embodiment, the microcomputer 700 may previously store specific data at a specific address of the memory 705 of the LCD module 800 and then read specific data at the specific address of the memory 705 of the LCD module 800 and compare the read data with the previously stored data to check whether or not the data has been correctly read and then may adjust the setup time of the enable signal according to the checked result.

Figure 6:
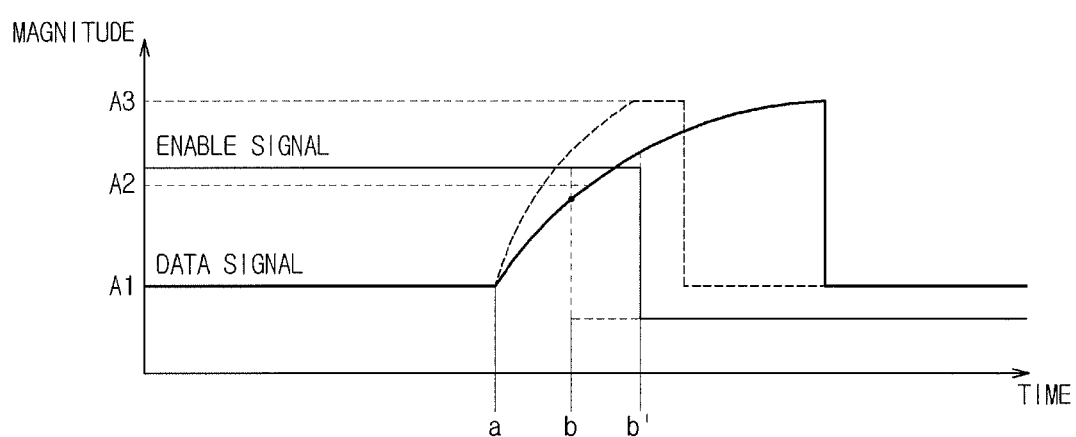
FIG. 6 illustrates how an enable signal adjuster of FIG. 3 adjusts the setup time.

FIG. 6 illustrates how the enable signal adjuster of FIG. 3 adjusts the setup time.

As shown in FIG. 6, the enable signal adjuster 704 may adjust the basic setup time (b-a), which has been set by default, to (a-b') by extending the setup time (b-a) by a predetermined time (b'-b). When the setup time has been extended, an enable signal is applied in accordance with data that has been changed due to brokenness or data that has been changed due to replacement of the LCD module. The basic setup time (b-a) is set as a minimum setup time according to the specifications of the LCD module 800 during design. As described above, the data comparator 706 compares data that has been transmitted to be written to the LCD module 800 and data that has been read and transmitted from the LCD module 800. Then, when the data transmitted to be written to the LCD module 800 and the data read and transmitted from the LCD module 800 are not identical, the enable signal adjuster 704 repeats the above procedure while extending the setup time by a predetermined interval until the two data are identical. On the other hand, the data comparator 706 performs a read operation on data that has been stored at a specific address of the storage unit 805 of the LCD module 800 and compares data acquired through the read operation with data stored in the memory 705 of the microcomputer 700. Then, when the data acquired through the read operation is not identical to the data stored in the memory 705 of the microcomputer 700, the enable signal adjuster 704 repeats the above procedure while extending the setup time by a predetermined interval until the two data are identical.

Figure 7:
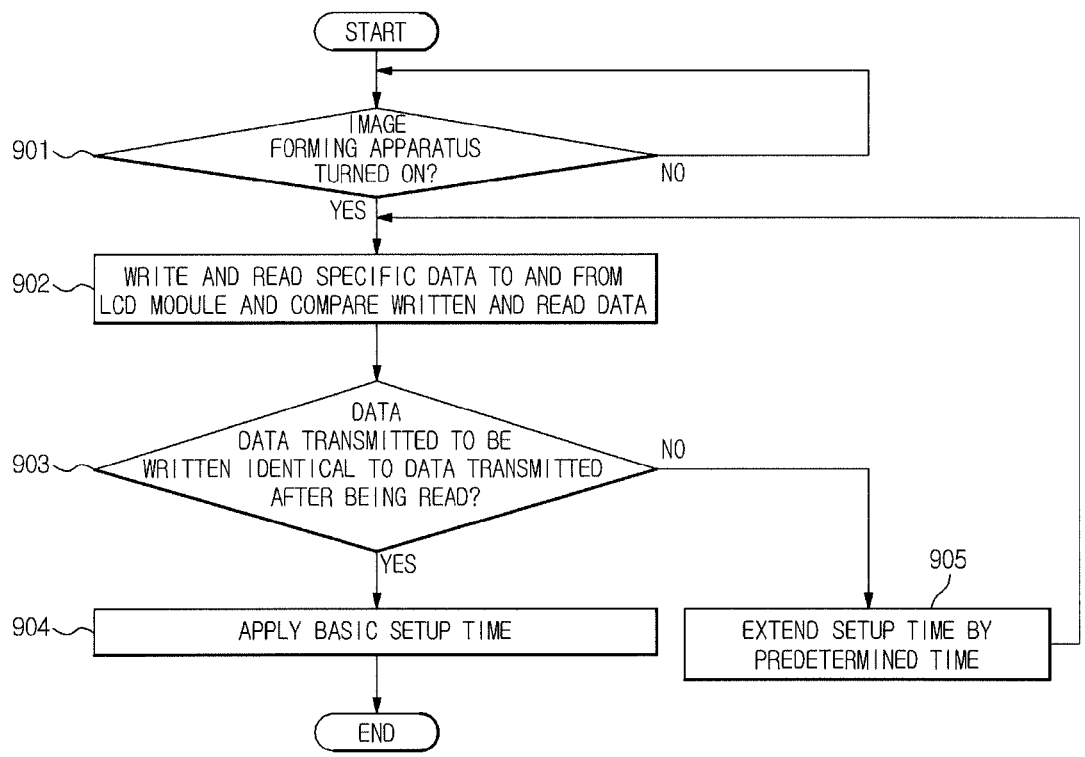
FIG. 7 is a control flow diagram of an image forming apparatus according to an embodiment of the present invention.

FIG. 7 is a control flow diagram of an image forming apparatus according to an embodiment of the present invention.

When the image forming apparatus is turned on, the microcomputer 700 performs operations to write and read specific data to and from the LCD module 800 and compares the written and read data. Specifically, the data comparator 706 of the microcomputer 700 compares data that has been transmitted to be written to the LCD module 800 and data that has been read and transmitted from the LCD module 800 (901 and 902).

Then, when the data transmitted to be written to the LCD module 800 and the data read and transmitted from the LCD module 800 are identical, the enable signal transmitter 703 of the microcomputer 700 outputs an enable signal by applying the basic setup time (903 and 904).

On the other hand, when the data transmitted to be written to the LCD module 800 and the data read and transmitted from the LCD module 800 are different, the enable signal adjuster 704 of the microcomputer 700 extends the setup time by a predetermined time and repeats the procedure after operation 902 until the two data are identical (905).

Figure 8:
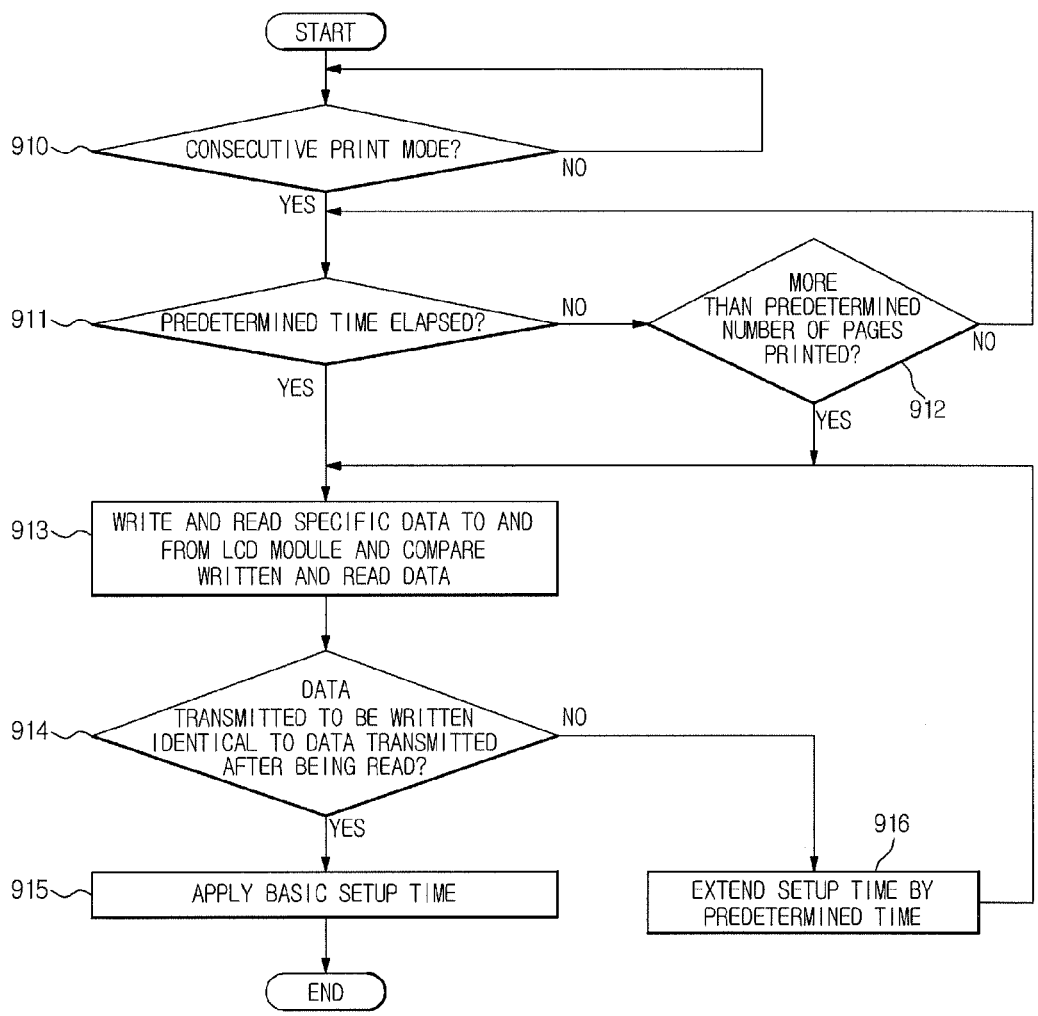
FIG. 8 is a control flow diagram of an image forming apparatus according to another embodiment of the present invention.

FIG. 8 is a control flow diagram of an image forming apparatus according to another embodiment of the present invention.

The microcomputer 700 checks whether or not the image forming apparatus is currently performing a print operation. If the image forming apparatus is currently performing a print operation, the microcomputer 700 checks whether the print mode is a basic print mode or a consecutive print mode (910).

If the print mode is a consecutive print mode, the microcomputer 700 checks whether or not a predetermined time has elapsed after printing. When the predetermined time has elapsed, the microcomputer 700 performs operations to write and read specific data and compares the written and read data. Specifically, the data comparator 706 of the microcomputer 700 compares data that has been transmitted to be written to the LCD module 800 and data that has been read and transmitted from the LCD module 800 (911 and 913).

Then, when the data transmitted to be written to the LCD module 800 and the data read and transmitted from the LCD module 800 are identical, the enable signal transmitter 703 of the microcomputer 700 outputs an enable signal by applying the basic setup time (914 and 915).

On the other hand, when the data transmitted to be written to the LCD module 800 and the data read and transmitted from the LCD module 800 are different, the enable signal adjuster 704 of the microcomputer 700 extends the setup time by a predetermined time and repeats the procedure after operation 911 until the two data are identical (916).

On the other hand, when the microcomputer 700 has determined in operation 911 that the predetermined time has not elapsed after printing, the microcomputer 700 checks whether or not the number of consecutively printed pages is greater than a predetermined number of pages (912).

Then, if the number of consecutively printed pages is greater than the predetermined number of pages, the microcomputer 700 performs operations to write and read specific data and compares the written and read data (913).

Then, when the data transmitted to be written to the LCD module 800 and the data read and transmitted from the LCD module 800 are identical, the enable signal transmitter 703 of the microcomputer 700 outputs an enable signal by applying the basic setup time (914 and 915).

Figure 9:
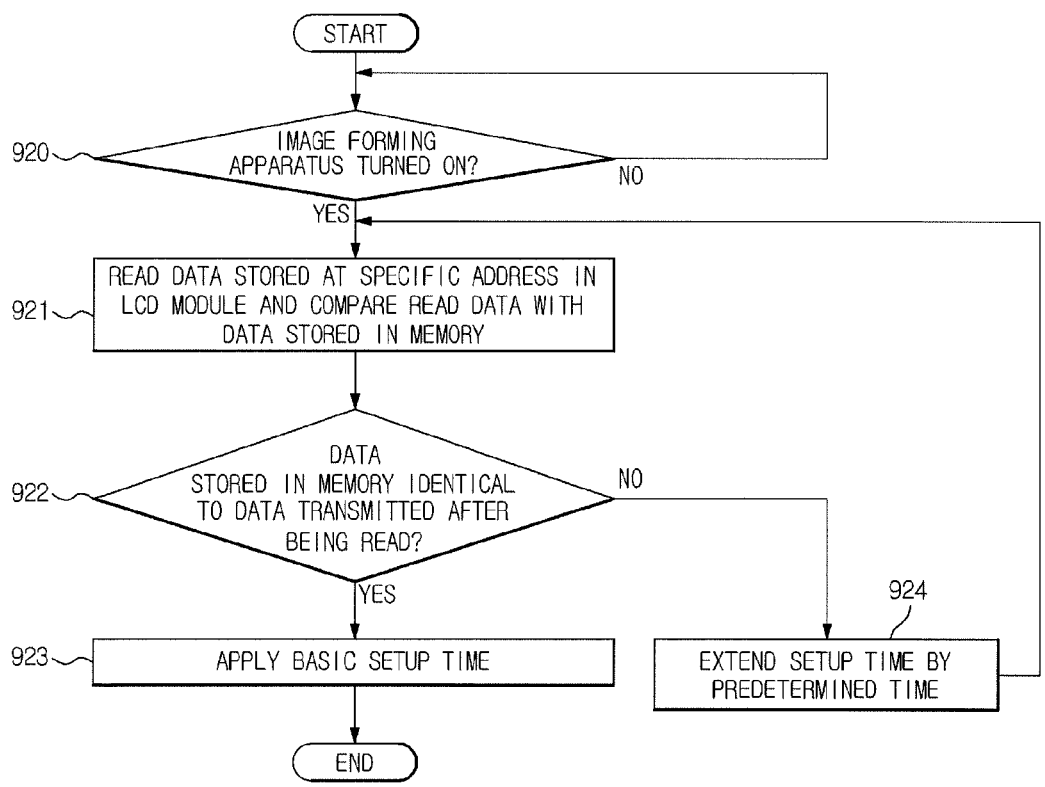
FIG. 9 is a control flow diagram of an image forming apparatus according to another embodiment of the present invention.

FIG. 9 is a control flow diagram of an image forming apparatus according to another embodiment of the present invention.

In the embodiment of FIG. 9, the operation 902 of FIG. 7 is replaced with an operation to read data that has been previously stored at a specific address of the LCD module and then to compare the read data (i.e., data acquired through the read operation) with data that has been previously stored in the memory 705. In addition, the operation 903 of FIG. 7 is replaced with an operation to compare the data that has been transmitted after being read with the previously stored data to check whether the two data are identical. A description of the other features of FIG. 9 is replaced with that of FIG. 7 since the other features are similar to those of FIG. 7.

Figure 10:
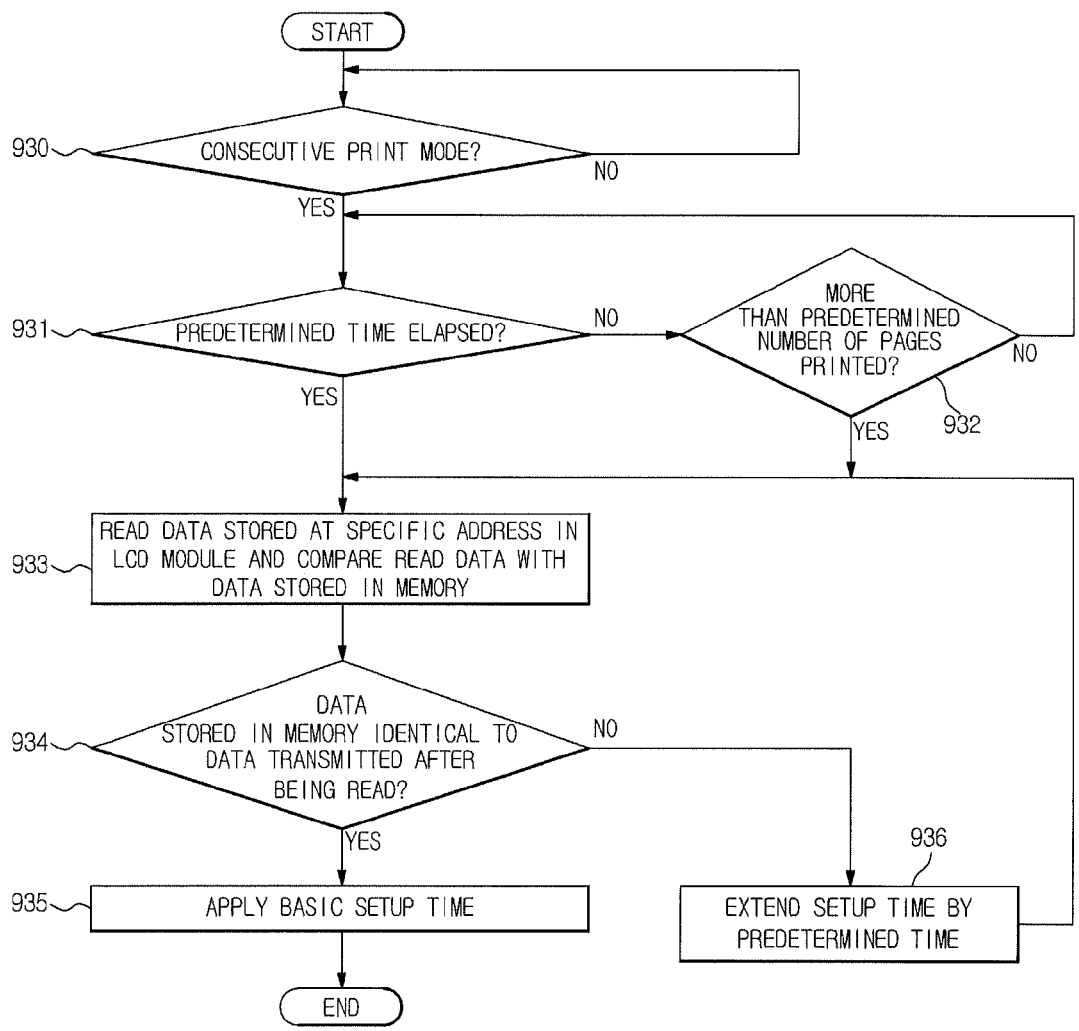
FIG. 10 is a control flow diagram of an image forming apparatus according to another embodiment of the present invention.

FIG. 10 is a control flow diagram of an image forming apparatus according to another embodiment of the present invention.

In the embodiment of FIG. 10, the operation 913 of FIG. 8 is replaced with an operation to read data that has been previously stored at a specific address of the LCD module and then to compare the read data (i.e., data acquired through the read operation) with data that has been previously stored in the memory 705. In addition, the operation 913 of FIG. 8 is replaced with an operation to compare the data that has been transmitted after being read with the previously stored data to check whether the two data are identical. A description of the other features of FIG. 10 is replaced with that of FIG. 8 since the other features are similar to those of FIG. 8.

As is apparent from the above description, according to the embodiments of the present invention, it may be possible to prevent brokenness of data displayed on the display since the setup time is adjusted when the image forming apparatus is initially powered on or when a predetermined time has elapsed during consecutive printing or when a predetermined number of pages have been printed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image forming apparatus comprising a microcomputer, the microcomputer comprising:
    a data transceiver to transmit a write signal and data to a Liquid Crystal Display (LCD) module to perform a write operation on a storage unit of the LCD module, to transmit a read signal to the LCD module to perform a read operation on the written data, and to receive data acquired through the read operation;
    a data comparator to compare the data transmitted for the write operation and the data acquired through the read operation;
    an enable signal adjuster to adjust a setup time of an enable signal when the data transmitted for the write operation and the data acquired through the read operation are different; and
    an enable signal transmitter to transmit an enable signal according to the setup time.

2. The image forming apparatus according to claim 1, wherein the microcomputer further comprises a memory to store a basic setup time of the enable signal.

3. The image forming apparatus according to claim 2, wherein adjusting the setup time comprises extending the basic setup time of the enable signal by a predetermined interval.

4. The image forming apparatus according to claim 3, wherein adjusting the setup time by extending the basic setup time of the enable signal by a predetermined interval comprises:
    adjusting the setup time by comparing data transmitted for the write operation and data acquired through the read operation at least once and repeatedly increasing the basic setup time until the data transmitted for the write operation and the data acquired through the read operation are identical.

5. The image forming apparatus according to claim 1, wherein adjusting the setup time comprises adjusting the setup time when the image forming apparatus is initially powered on or adjusting the setup time when a predetermined time has elapsed during consecutive printing or when a predetermined number of pages have been printed.

6. The image forming apparatus according to claim 1, wherein the microcomputer further comprises a power source to provide power to the LCD module and a scaler to convert various input signals input to the LCD module into digital signals and to scale the digital signals.

7. An image forming apparatus comprising a microcomputer, the microcomputer comprising:
    a data transceiver to transmit a read signal to perform a read operation on data stored at a specific address of a storage unit of an LCD module and to receive data acquired through the read operation;
    a memory to store data identical to the data stored at the specific address of the storage unit;
    a data comparator to compare the data acquired through the read operation and data previously stored in the memory;
    an enable signal adjuster to adjust a setup time of an enable signal when the data acquired through the read operation and the data previously stored in the memory are different; and
    an enable signal transmitter to transmit an enable signal according to the setup time.

8. The image forming apparatus according to claim 7, wherein the microcomputer further comprises a memory to store a basic setup time of the enable signal.

9. The image forming apparatus according to claim 8, wherein adjusting the setup time comprises extending the basic setup time of the enable signal by a predetermined interval.

10. The image forming apparatus according to claim 9, wherein adjusting the setup time by extending the basic setup time of the enable signal by a predetermined interval comprises:
adjusting the setup time by comparing the data acquired through the read operation and the data previously stored in the memory at least once and repeatedly increasing the basic setup time until the data acquired through the read operation and the data previously stored in the memory are identical.

11. The image forming apparatus according to claim 7, wherein adjusting the setup time comprises adjusting the setup time when the image forming apparatus is initially powered on or adjusting the setup time when a predetermined time has elapsed during consecutive printing or when a predetermined number of pages have been printed.

12. The image forming apparatus according to claim 7, wherein the microcomputer further comprises a power source to provide power to the LCD module and a scaler to convert various input signals input to the LCD module into digital signals and to scale the digital signals.

13. A method of controlling an image forming apparatus, the method comprising:
transmitting a write signal and data to a liquid Crystal Display (LCD) module to perform a write operation on a storage unit of the LCD module;
transmitting a read signal to perform a read operation on the written data and receiving data acquired through the read operation; and
comparing the data transmitted for the write operation and the data acquired through the read operation, adjusting a setup time of an enable signal when the data transmitted for the write operation and the data acquired through the read operation are different, and transmitting an enable signal according to the setup time.

14. The method according to claim 13, wherein adjusting the setup time comprises adjusting the setup time when the image forming apparatus is initially powered on or adjusting the setup time when a predetermined time has elapsed during consecutive printing or when a predetermined number of pages have been printed.

15. The method according to claim 14, wherein, when the image forming apparatus is initially powered on, a write operation and a read operation are performed to write and read the data to and from the storage unit according to a basic setup time and data transmitted for the write operation and data acquired through the read operation are compared to adjust the setup time.

16. The method according to claim 14, wherein, when the predetermined time has elapsed during the consecutive printing or when the predetermined number of pages have been printed, a write operation and a read operation are performed to write and read the data to and from the storage unit according to a basic setup time and data transmitted for the write operation and data acquired through the read operation are compared to adjust the setup time.

17. The method according to claim 14, wherein, when the image forming apparatus is initially powered on or when the predetermined time has elapsed during the consecutive printing or when the predetermined number of pages have been printed, a write operation and a read operation are performed to write and read the data to and from the storage unit according to a basic setup time, and data transmitted for the write operation and data acquired through the read operation are compared, and then the setup time is adjusted by increasing the basic setup time when the data transmitted for the write operation and the data acquired through the read operation are different.

18. A method of controlling an image forming apparatus, the method comprising:
transmitting a read signal to perform a read operation on data stored at a specific address of an LCD module and receiving data acquired through the read operation;
comparing the data acquired through the read operation and data previously stored in a memory; and
adjusting a setup time of an enable signal when the data acquired through the read operation and the data previously stored in the memory are different.

19. The method according to claim 18, wherein adjusting the setup time comprises adjusting the setup time when the image forming apparatus is initially powered on or adjusting the setup time when a predetermined time has elapsed during consecutive printing or when a predetermined number of pages have been printed.

20. The method according to claim 19, wherein, when the image forming apparatus is initially powered on, a read operation is performed on data at the specific address of the storage according to a basic setup time and the data acquired through the read operation and the data previously stored in the memory are compared to adjust the setup time.

21. The method according to claim 19, wherein, when the predetermined time has elapsed during the consecutive printing or when the predetermined number of pages have been printed, a read operation is performed on data at the specific address of the storage according to a basic setup time and the data acquired through the read operation and the data previously stored in the memory are compared to adjust the setup time.

22. The method according to claim 19, wherein, when the image forming apparatus is initially powered on or when the predetermined time has elapsed during the consecutive printing or when the predetermined number of pages have been printed, a read operation is performed on data at the specific address of the storage according to a basic setup time, and the data acquired through the read operation and the data previously stored in the memory are compared, and then the setup time is adjusted by increasing the basic setup time when the data acquired through the read operation and the data previously stored in the memory are different.

23. An image forming apparatus comprising:
an LCD module to receive data and a write signal from a microcomputer and writes the data to a storage unit at a specific address, and
to perform a read operation on data written to the specific address upon receiving a read signal from the microcomputer and transmit the read data to the microcomputer.

24. An image forming apparatus comprising:
an LCD module to perform a read operation on data previously stored in a storage unit at a specific address upon receiving a read signal from a microcomputer and to transmit data acquired through the read operation to the microcomputer.

25. The image forming apparatus according to claim 23, wherein the LCD module comprises a liquid crystal panel and the liquid crystal panel is provided above a paper discharge portion.

26. The image forming apparatus according to claim 24, wherein the LCD module comprises a liquid crystal panel and the liquid crystal panel is provided above a paper discharge portion.

* * * * *